Patented Nov. 13, 1951

2,574,803

UNITED STATES PATENT OFFICE 2,574,803

METHOD OF BONDING PLYWOOD, AN ADHESIVE THEREFOR AND A PROCESS OF MAKING IT

William G. Van Beckum, Longview, Wash., and Harold L. Cook, Tigard, Oreg., assignors to Weyerhaeuser Timber Company, Longview, Wash., a corporation of Washington No Drawing. Application March 29, 1947, Serial No. 738,216

15 Claims. (Cl. 154—133)

This invention relates to adhesives and to methods for their production. More particularly, the invention pertains to adhesive compositions comprising powdered parenchyma tissue from bark phloem, to methods for the production of such adhesives and to a method of bonding a plurality of plywood members therewith.

The powdered parenchyma tissue which is the adhesively active ingredient of the compositions of the invention may be derived from the phloem of the bark of various species of trees, the bark of certain of the coniferous trees being an especially suitable source. Such trees include the coniferous trees of commerce such as the firs, the pines, the cedars, the hemlocks, etc. The barks of these trees contain substantial quantities of bark phloem and are readily obtainable as by-products of industries utilizing the woody portion of the trees.

In general, the barks of these and other trees comprise cork, phelloderm and phloem in varying proportions and admixed with other matter. The phloem contains sclerenchyma tissue, consisting largely of fiber or stone cells, and parenchyma tissue, chiefly comprising sieve tubes with relatively minor proportions of food storage cells, connecting cells, ray tissues, etc. It is with the parenchyma tissue of bark phloem that the instant invention is concerned.

Parenchyma tissue is present in bark in varying amounts, depending upon the species of the tree from which the bark is derived. For example, the barks of Western hemlock and Ponderosa pine contain about 50% by weight parenchyma tissue, while 35% of the total bark weight of the Douglas fir and 15% of the total bark weight of the white fir comprise that constituent. Constitutionally, the parenchyma tissue comprises a major proportion of lignin with lesser amounts of polysaccharides, pentosans and inorganic substances. It may be obtained in comminuted form as a well defined fraction by adjusting the friability of the bark, principally by control of the moisture content thereof to a value of about 15% to 25% by weight, dry bark basis, so that a suitable comminuting process such as ball milling may be employed to pulverize differentially the constituents of the bark, thereby breaking the bond therebetween and permitting separation of the bark constituents by selective screening. This process results in the separation of the bark substance into at least three fractions, comprising cork, sclerenchyma tissue and comminuted parenchyma tissue derived from the bark phloem. The latter fraction is also referred to herein as bark powder.

As obtained by the foregoing process, the bark powder is a dark colored (usually brown) pulverulent material which comprises about 80% or more by weight bark phloem and contains not more than about 20% by weight of non-phloem constituents. It is sufficiently comminuted to pass through a 48-mesh screen. This powdered product may be fractionated by mechanical methods to separate a portion having a particle size sufficiently small so that 90% will pass through a 325-mesh screen. The resulting finely divided product is particularly well suited for the preparation of the adhesives of the invention.

When the bark powder is obtained from the bark of the Douglas fir, it has a bulk density of about 1.17 grams per cubic centimeter. The pH of a hot aqueous mixture containing 10 grams bark powder per 100 cubic centimeters water is about 3.5. The analysis, expressed in per cent by weight, is substantially as follows:

| | |
|---|---|
| Lignin | 55 |
| Polysaccharides | 17 |
| Pentosans | 12 |
| Water solubles (including tannins) | 8 |
| Ether solubles | 5 |
| Ash | 3 |

A substantial content of the bark powder, especially the content of lignins, tannins and free organic acids, is reactive toward alkali. As subsequently will appear, this fact is of importance in the formulation of the adhesives of the invention.

The present invention is predicated on the discovery that bark powder, comprising predominantly pulverized parenchyma tissue from bark phloem, either per se or admixed with other materials such as conditioning agents or catalysts, has properties such as to make it a useful adhesive. When an adhesive comprising bark powder is applied as an interface to surfaces to be united and the resulting assembly subjected to the action of heat and pressure, the adhesive sets to accomplish the union of the surfaces through a strong, durable bond. In view of the highly complex nature of bark powder and of the reactions taking place during formulation of the adhesive, it is obviously difficult, if not impossible, to characterize precisely the reactions occurring when the adhesive is thus heated under pressure. It appears probable, however, that the lignins, tannins, and other reactive bodies which, together with inner material, comprise parenchyma tissue from bark phloem, react at elevated pressures and temperatures, especially in the presence of catalysts, to form a relatively hard, infusible, resin-like material which has adhesive properties. The chemically inert content of bark powder, while not participating actively in the setting reaction, may serve as a filler or extender, and in this manner contribute to the production of the final bond.

Although the adhesive compositions of the invention may successfully be applied to the uniting of a variety of surfaces, they are particularly applicable to the gluing of wood, as in the manufacture of plywood. They are, therefore, described with particular reference to the manufacture of this product, although it is to be understood that no limitation or restriction of the use of the adhesives of the invention thereto is intended.

In their simplest embodiment, the novel adhesives of the invention comprise powdered parenchyma tissue from bark phloem in admixture with a solution of alkali comprising a dilute aqueous solution of a basic acting compound of an alkali metal, such as the carbonates and hydroxides of lithium, sodium, potassium, cesium and rubidium. Ammonium hydroxide and some of the strong organic bases such as tetramethyl ammonium hydroxide may also be used. It is preferred, however, to use as an alkaline catalyst sodium hydroxide, sodium carbonate, or mixtures of these two basic materials.

The relative proportions of bark powder and basic material to be used in the formulations of the adhesives are, obviously, dependent upon such factors as the source of the bark powder, the particular basic compound employed, the operating conditions, the nature of the bond desired, etc. In general, however, the bark powder is used with sufficient amount of alkali to catalyze the interaction of the chemically active constituents of the bark powder to form an adhesive product. Usually sufficient alkali is employed to raise the pH of the aqueous mixture of bark powder from an original value, which, in the case of Douglas fir bark powder, is about 3.5, to a value between 3.5 and 10, a preferred range being between about 5 and about 8. The desired increase in pH may usually be gained by adding up to about 20% by weight alkali, preferably between about 2% and about 10% by weight, based upon the weight of the bark powder.

When bark powder is used together with an alkali in the adhesive compositions of the invention, it is important and critical to the successful use of the adhesive that the bark powder be given a pretreatment or conditioning treatment with the alkali in the absence of the material to which the resulting adhesive composition is to be applied. Since bark powder is reactive toward alkali, the pretreatment promotes the reaction of the bark powder with the alkali to form a new and adhesively useful product. The reaction should be effected in such a manner as to insure that the alkali will react uniformly with the bark powder. If the alkali is used in solid form or in the form of a highly concentrated solution, it tends to react primarily with that portion of the bark powder with which it is in immediate contact. If, on the other hand, the alkali is introduced in the form of a dilute aqueous solution, particularly if it is introduced with stirring or other form of agitation, it reacts uniformly with all portions of the bark powder mass with resultant advantage to the product. The pretreatment, therefore, comprises forming an intimate mixture of bark powder in a dilute aqueous solution of an alkali, and stirring or otherwise agitating said mixture until the exothermic reaction which occurs is complete. This usually requires about twenty minutes. The resulting product is then ready for admixture with or application to the materials to be united.

As is indicated above, the bark powder adhesives of the invention may be employed in the manufacture of plywood. For this use it is preferred to use the bark powder in conjunction with one or more alkaline substances. A representative formulation is as follows:

|  | Parts by weight |
|---|---|
| Bark powder | 5 |
| Water | 10 to 15 |
| Sodium carbonate | 0 to 2 |
| Sodium hydroxide | 1 to 2 |

This composition is most satisfactorily used if the bark powder is given a pretreatment or conditioning treatment in the manner described above. Thus, solutions of the alkaline constituents of the mixture may be formed by dissolving the sodium carbonate in about twice its weight of water and the sodium hydroxide in about 2½ times its weight of water. These solutions, together with the remainder of the water, are then mixed with the bark powder. An exothermic reaction between the bark powder and the alkaline content of the mixture ensues. This is of sufficient intensity to raise the temperature of the mixture to about 60° C., or about 140° F. To dissipate this heat, as well as to insure thorough mixing, the mass is stirred until the temperature thereof has been reduced to substantially room temperature. Although the time required for this is variable depending upon the size of the batch, the stirring means employed and other factors, time periods of the order of about twenty minutes are usually required. When cool, the adhesive mixture is ready for application to the wood veneers to be united.

The conditions usually employed in the plywood industry for hot pressing operations may satisfactorily be employed when using the above described adhesive in the manufacture of plywood. Thus, the adhesive may be applied to the veneers in spreads of about 60 pounds per thousand square feet double glue line, using spreaders of familiar types. The assembled veneers may then be hot pressed for time periods of between about five minutes and about ten minutes, preferably about eight minutes, at temperatures between about 280° F. and about 300° F., and pressures between about 180 pounds per square inch and about 240 pounds per square inch.

Thus 40 parts bark powder were mixed and pretreated with an aqueous solution comprising 80 parts water, 15 parts by weight sodium carbonate, and 8 parts by weight sodium hydroxide. After pretreatment, this mixture was applied to wood veneer in a spread of 66 pounds per thousand square feet double glue line. The assembled veneers were then pressed at 280° F. for ten minutes. The pressing operation proceeded in normal manner, and resulted in the production of a product having a dry shear strength of 130 pounds per square inch with substantial wood failure.

In another instance, 40 parts bark powder were pretreated with an aqueous solution comprising 100 parts water, 10 parts sodium carbonate, and 18 parts sodium hydroxide. The resulting mixture was then applied to wood veneers in a spread of 72.6 pounds per thousand square feet double glue line. After hot pressing the assembled veneers at 280° F. for eleven minutes, the plywood product had a dry shear value of 180 pounds per square inch. In this case, as in the preceding case, the strength of the bond was further indicated by wood failure.

The present invention may be carried out by providing a spreadable adhesive consisting essentially of the reaction product of comminuted parenchyma tissue bark powder derived from bark phloem and an aqueous solution produced by mixing sodium hydroxide and sodium carbonate and water in the relative proportions by weight of 20 parts of comminuted parenchyma tissue, 40 parts of water, 4 parts of sodium hydroxide, and 5 parts of sodium carbonate, said proportions providing a sufficient volume of the aqueous solution to enable the alkali constituents to react with the bark phloem and for the reaction product to be dispersed in solution. In other words, the solution is present in sufficient volume to disperse the reaction product therein.

The spreadable adhesive of the present invention may also be prepared by mixing comminuted parenchyma tissue bark derived from bark phloem in an aqueous solution of sodium hydroxide and water in the relative proportions of 20 parts of comminuted parenchyma tissue, 40 parts of water, and 4 parts of sodium hydroxide, said proportions providing a sufficient volume of the aqueous solution to enable the alkali constituents to react with the bark phloem and for the reaction product to be dispersed in solution.

In a manner similar to that described above, the adhesives of the invention are applied to the uniting of surfaces other than wood.

Having now described our invention and in what manner the same may be used, what we claim as new and desire to protect by Letters Patent is:

1. A spreadable adhesive consisting essentially of the reaction product of comminuted parenchyma tissue bark powder derived from bark phloem and an aqueous solution of a basic acting soluble compound of an alkali metal in an amount to confer upon the resulting aqueously dispersed mass a pH between about 3.5 and about 10, said solution being present in sufficient volume to disperse the reaction product.

2. A spreadable adhesive consisting essentially of the reaction product of comminuted parenchyma tissue bark powder derived from bark phloem and an aqueous solution of a basic acting soluble compound of an alkali metal in an amount to confer upon the resulting aqueously dispersed mass a pH between about 5 and about 8, said solution being present in sufficient volume to disperse the reaction product.

3. A spreadable adhesive consisting essentially of the exothermic reaction product of comminuted parenchyma tissue bark powder derived from bark phloem and an aqueous solution of a basic acting soluble compound of an alkali metal, the amount of alkali in said solution being equal to between about 2% and about 20% based on the weight of the bark powder, said solution being present in sufficient volume to disperse the reaction product therein.

4. A spreadable adhesive consisting essentially of the reaction product of comminuted parenchyma tissue bark powder derived from bark phloem and an aqueous solution of a basic acting soluble compound of an alkali metal, the amount of alkali in said solution being equal to between about 2% and about 10% based on the weight of the bark powder, said solution being present in sufficient volume to disperse the reaction product therein.

5. A spreadable adhesive consisting essentially of the reaction product of comminuted parenchyma tissue bark powder derived from bark phloem and an aqueous solution of sodium hydroxide in an amount to confer on the resulting aqueously dispersed mass a pH between about 3.5 and about 10, said solution being present in sufficient volume to disperse the reaction product.

6. A spreadable adhesive consisting essentially of the reaction product of comminuted parenchyma tissue bark powder derived from bark phloem and an aqueous solution of sodium hydroxide in an amount to confer on the aqueously dispersed mass a pH between about 5 and about 8, said solution being present in sufficient volume to disperse the reaction product.

7. A spreadable adhesive consisting essentially of the reaction product of comminuted parenchyma tissue bark powder derived from bark phloem and an aqueous solution produced by mixing sodium hydroxide and sodium carbonate and water in the relative proportions by weight of 20 parts of comminuted parenchyma tissue, 40 parts of water, 4 parts of sodium hydroxide, and 5 parts sodium carbonate, said solution being present in sufficient volume to disperse the reaction product therein.

8. A spreadable adhesive consisting essentially of the reaction product of comminuted parenchyma tissue bark powder derived from bark phloem and an aqueous solution of sodium hydroxide and water in the relative proportions by weight of 20 parts of comminuted parhenchyma tissue, 40 parts of water, and 4 parts of sodium hydroxide, said solution being present in sufficient volume to disperse the reaction product therein.

9. The process of producing a spreadable adhesive comprising comminuting the bark of a tree to break the bond between the elements of said bark comprising cork, sclerenchyma tissue and parenchyma tissue, separating the latter from the comminuted material and exothermically reacting the comminuted material with an aqueous solution of a basic acting soluble compound of an alkali metal in an amount to confer on the resulting aqueously dispersed mass a pH between about 3.5 and about 10, said solution being present in sufficient volume to produce a fluid adhesive containing said reaction product dispersed therein.

10. The method of bonding a plurality of plywood members one to the other comprising interposing between said plywood members a liquid adhesive consisting essentially of the exothermic reaction product of comminuted parenchyma tissue bark powder derived form bark phloem and an aqueous solution of a basic acting soluble compound of an alkali metal, the amount of alkali in said solution being equal to about 2% and about 10% based on the weight of the bark powder, said solution being present in sufficient volume to disperse the reaction product therein, and setting the adhesive of said assembly under heat and pressure.

11. The method defined in claim 10 in which the basic acting compound is sodium hydroxide.

12. The method of bonding a plurality of plywood members one to the other comprising interposing between said plywood members a liquid adhesive consisting essentially of the exothermic reaction product of comminuted parenchyma tissue bark powder derived from bark phloem and an aqueous solution of a basic acting soluble compound of an alkali metal in an amount to confer upon the aqueous adhesive a pH of between about 3.5 and about 10, said solution being present in sufficient volume to produce a fluid adhesive containing said reaction product dispersed therein, and setting the adhesive of said assembly under heat and pressure.

13. The method of bonding a plurality of plywood members one to the other comprising interposing between said plywood members a liquid adhesive consisting essentially of the exothermic reaction product of comminuted parenchyma tissue bark powder derived from bark phloem and an aqueous solution of a basic acting soluble compound of an alkali metal in an amount to confer upon the aqueous adhesive a pH of between about 5 and about 8, said solution being present in sufficient volume to produce a fluid adhesive containing said reaction product dispersed therein, and setting the adhesive of said assembly under heat and pressure.

14. The method defined in claim 40 in which the basic acting compound of an alkali metal is sodium hydroxide.

15. The method of bonding a plurality of plywood members one to the other comprising interposing between said plywood members a liquid adhesive consisting essentially of the exothermic reaction product of comminuted parenchyma tissue bark powder derived from bark phloem and an aqueous solution of a basic acting soluble compound of an alkali metal, the amount of alkali in said solution being equal to between about 2% and about 20% based on the weight of the bark powder, said solution being present in sufficient volume to disperse the reaction product therein, and setting the adhesive of said assembly under pressure and heat.

WILLIAM G. VAN BECKUM.
HAROLD L. COOK.

REFERENCES CITED

The following references are of record in the file of this patent:

UNITED STATES PATENTS

| Number | Name | Date |
|---|---|---|
| 118,177 | Allen | Aug. 22, 1871 |
| 2,314,203 | Fairclough | Mar. 16, 1943 |
| 2,319,182 | Van der Pyl | May 11, 1943 |
| 2,360,376 | Van Epps | Oct. 17, 1944 |

FOREIGN PATENTS

| Number | Country | Date |
|---|---|---|
| 1,024 of 1870 | Great Britain | Apr. 27, 1870 |
| 12,443 of 1928 | Australia | Apr. 9, 1929 |

OTHER REFERENCES

New Products and Materials, Porter; Chem. & Eng., July 1947, pgs. 159, 160 and 162.

Douglas Fir Bark Utilized as Filler, Marple; Plastics, Aug. 1947, pgs. 44, 65, 66 and 67.

---

Certificate of Correction

Patent No. 2,574,803           November 13, 1951

WILLIAM G. VAN BECKUM ET AL.

It is hereby certified that error appears in the printed specification of the above numbered patent requiring correction as follows:

Column 6, line 35, for "parhenchyma" read *parenchyma*; column 7, line 23, for the claim reference numeral "40" read *12*;

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.* and an aqueous solution of a basic acting soluble compound of an alkali metal in an amount to confer upon the aqueous adhesive a pH of between about 3.5 and about 10, said solution being present in sufficient volume to produce a fluid adhesive containing said reaction product dispersed therein, and setting the adhesive of said assembly under heat and pressure.

13. The method of bonding a plurality of plywood members one to the other comprising interposing between said plywood members a liquid adhesive consisting essentially of the exothermic reaction product of comminuted parenchyma tissue bark powder derived from bark phloem and an aqueous solution of a basic acting soluble compound of an alkali metal in an amount to confer upon the aqueous adhesive a pH of between about 5 and about 8, said solution being present in sufficient volume to produce a fluid adhesive containing said reaction product dispersed therein, and setting the adhesive of said assembly under heat and pressure.

14. The method defined in claim 40 in which the basic acting compound of an alkali metal is sodium hydroxide.

15. The method of bonding a plurality of plywood members one to the other comprising interposing between said plywood members a liquid adhesive consisting essentially of the exothermic reaction product of comminuted parenchyma tissue bark powder derived from bark phloem and an aqueous solution of a basic acting soluble compound of an alkali metal, the amount of alkali in said solution being equal to between about 2% and about 20% based on the weight of the bark powder, said solution being present in sufficient volume to disperse the reaction product therein, and setting the adhesive of said assembly under pressure and heat.

WILLIAM G. VAN BECKUM.
HAROLD L. COOK.

REFERENCES CITED

The following references are of record in the file of this patent:

UNITED STATES PATENTS

| Number | Name | Date |
|---|---|---|
| 118,177 | Allen | Aug. 22, 1871 |
| 2,314,203 | Fairclough | Mar. 16, 1943 |
| 2,319,182 | Van der Pyl | May 11, 1943 |
| 2,360,376 | Van Epps | Oct. 17, 1944 |

FOREIGN PATENTS

| Number | Country | Date |
|---|---|---|
| 1,024 of 1870 | Great Britain | Apr. 27, 1870 |
| 12,443 of 1928 | Australia | Apr. 9, 1929 |

OTHER REFERENCES

New Products and Materials, Porter; Chem. & Eng., July 1947, pgs. 159, 160 and 162.

Douglas Fir Bark Utilized as Filler, Marple; Plastics, Aug. 1947, pgs. 44, 65, 66 and 67.

---

Certificate of Correction

Patent No. 2,574,803      November 13, 1951

WILLIAM G. VAN BECKUM ET AL.

It is hereby certified that error appears in the printed specification of the above numbered patent requiring correction as follows:

Column 6, line 35, for "parhenchyma" read *parenchyma*; column 7, line 23, for the claim reference numeral "40" read *12*;

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*

Certificate of Correction

Patent No. 2,574,803

November 13, 1951

WILLIAM G. VAN BECKUM ET AL.

It is hereby certified that error appears in the printed specification of the above numbered patent requiring correction as follows:

Column 6, line 35, for "parhenchyma" read *parenchyma*; column 7, line 23, for the claim reference numeral "40" read *12*;

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*